US008245059B2

(12) United States Patent
Jackson

(10) Patent No.: US 8,245,059 B2
(45) Date of Patent: *Aug. 14, 2012

(54) SYSTEM AND METHOD FOR MANAGING ENERGY CONSUMPTION IN A COMPUTE ENVIRONMENT

(75) Inventor: David Brian Jackson, Spanish Fork, UT (US)

(73) Assignee: Adaptive Computing Enterprises, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,318

(22) Filed: Aug. 12, 2010

(65) Prior Publication Data

US 2011/0035072 A1 Feb. 10, 2011

Related U.S. Application Data

(62) Division of application No. 12/179,142, filed on Jul. 24, 2008.

(60) Provisional application No. 61/046,636, filed on Apr. 21, 2008.

(51) Int. Cl.
*G06F 1/00* (2006.01)
*G06F 1/26* (2006.01)
*G06F 1/32* (2006.01)
*G06F 9/46* (2006.01)

(52) U.S. Cl. ........ 713/300; 709/226; 713/320; 718/100; 718/102; 718/104

(58) Field of Classification Search .................. 718/100, 718/102, 104; 713/300, 320; 709/226
See application file for complete search history.

(56) References Cited

U.S. PATENT DOCUMENTS

| | | | |
|---|---|---|---|
| 5,155,854 A | 10/1992 | Flynn et al. | |
| 5,781,783 A | 7/1998 | Gunther et al. | |
| 5,864,699 A | 1/1999 | Merryman | |
| 6,418,459 B1 | 7/2002 | Gulick | |
| 6,571,215 B1 | 5/2003 | Mahapatro | |
| 6,813,897 B1 * | 11/2004 | Bash et al. | 62/175 |
| 6,925,364 B1 | 8/2005 | Huberman et al. | |
| 6,927,605 B2 | 8/2005 | Fetzer et al. | |
| 6,968,709 B2 | 11/2005 | Goth et al. | |
| 6,978,388 B1 | 12/2005 | Cornelius | |
| 7,127,625 B2 * | 10/2006 | Farkas et al. | 713/320 |
| 7,177,823 B2 | 2/2007 | Lam et al. | |

(Continued)

OTHER PUBLICATIONS

Chen et al., "A Flexible Serivice Model for advance Reservation", Computer Networks: The International Journal of Computer Telecommunications Networking, Elsevier science publishers, vol. 37, Issue 3-4, pp. 251-262, Nov. 5, 2001.

*Primary Examiner* — Mark Connolly
(74) *Attorney, Agent, or Firm* — Thomas M. Isaacson

(57) ABSTRACT

A system, method and non-transitory computer-readable storage medium are disclosed for managing workload in data centers. The method includes receiving information associated with at least one of energy consumption and a temperature of nodes each data center of a group of distributed data centers to yield received information. The method further includes analyzing workload associated with at least one second data center of the group of distributed data centers to yield an analysis of the workload, and modifying use of resources of the group of distributed data centers based on the received information and the analysis of the workload. One application can include migration of workload from one data center to another data center based on a variety of factors.

16 Claims, 6 Drawing Sheets

U.S. PATENT DOCUMENTS

| | | | |
|---|---|---|---|
| 7,197,630 B1 | 3/2007 | Alsup et al. | |
| 7,328,406 B2 | 2/2008 | Kalinoski et al. | |
| 7,330,983 B2 * | 2/2008 | Chaparro et al. | 713/300 |
| 7,369,968 B2 | 5/2008 | Johnson et al. | |
| 7,373,268 B1 | 5/2008 | Viredaz et al. | |
| 7,386,586 B1 | 6/2008 | Headley et al. | |
| 7,496,651 B1 | 2/2009 | Joshi | |
| 7,546,553 B2 | 6/2009 | Bozak et al. | |
| 7,640,547 B2 | 12/2009 | Neiman et al. | |
| 7,644,051 B1 | 1/2010 | Moore et al. | |
| 7,644,148 B2 | 1/2010 | Ranganathan et al. | |
| 7,653,735 B2 | 1/2010 | Mandato et al. | |
| 7,676,576 B1 | 3/2010 | Kommula | |
| 7,742,830 B1 | 6/2010 | Botes | |
| 7,827,425 B2 | 11/2010 | Hutsell et al. | |
| 7,844,839 B2 | 11/2010 | Palmer et al. | |
| 7,853,953 B2 | 12/2010 | Devarakonda et al. | |
| 7,865,751 B2 * | 1/2011 | Monferrer et al. | 713/322 |
| 2002/0007389 A1 | 1/2002 | Jones et al. | |
| 2002/0120741 A1 | 8/2002 | Webb et al. | |
| 2003/0067745 A1 | 4/2003 | Patel et al. | |
| 2003/0177406 A1 | 9/2003 | Bradley et al. | |
| 2004/0186905 A1 | 9/2004 | Young et al. | |
| 2004/0260746 A1 | 12/2004 | Brown et al. | |
| 2004/0260957 A1 | 12/2004 | Jeddeloh et al. | |
| 2005/0076043 A1 * | 4/2005 | Benedetti et al. | 707/100 |
| 2005/0182977 A1 | 8/2005 | Powers et al. | |
| 2005/0228618 A1 | 10/2005 | Patel et al. | |
| 2005/0278555 A1 | 12/2005 | Chaparro et al. | |
| 2005/0278760 A1 | 12/2005 | Dewar et al. | |
| 2005/0283782 A1 | 12/2005 | Lu et al. | |
| 2006/0047808 A1 | 3/2006 | Sharma et al. | |
| 2006/0168975 A1 | 8/2006 | Malone et al. | |
| 2006/0259621 A1 * | 11/2006 | Ranganathan et al. | 709/226 |
| 2006/0288241 A1 | 12/2006 | Felter et al. | |
| 2007/0081888 A1 | 4/2007 | Harrison | |
| 2007/0089446 A1 | 4/2007 | Larson et al. | |
| 2007/0186123 A1 | 8/2007 | Winbom | |
| 2007/0294197 A1 | 12/2007 | Jackson | |
| 2008/0109811 A1 | 5/2008 | Krauthgamer et al. | |
| 2008/0186670 A1 | 8/2008 | Lyon et al. | |
| 2008/0307238 A1 | 12/2008 | Bieswanger et al. | |
| 2009/0119233 A1 * | 5/2009 | Dunagan et al. | 705/412 |
| 2009/0125825 A1 | 5/2009 | Rye et al. | |
| 2009/0132097 A1 | 5/2009 | Sharma et al. | |
| 2009/0144115 A1 * | 6/2009 | Drew et al. | 705/8 |
| 2009/0165012 A1 | 6/2009 | Corona | |
| 2009/0177334 A1 | 7/2009 | Artman et al. | |
| 2009/0235097 A1 | 9/2009 | Hamilton et al. | |
| 2009/0265568 A1 * | 10/2009 | Jackson | 713/320 |
| 2009/0265704 A1 | 10/2009 | Branda et al. | |
| 2009/0276095 A1 | 11/2009 | Pienta et al. | |
| 2010/0010678 A1 | 1/2010 | Dawson et al. | |
| 2010/0037225 A1 | 2/2010 | Doyle et al. | |
| 2010/0087963 A1 | 4/2010 | Boston et al. | |
| 2010/0211669 A1 | 8/2010 | Dalgas et al. | |
| 2010/0218186 A1 | 8/2010 | Wolfe et al. | |
| 2011/0035072 A1 | 2/2011 | Jackson | |
| 2011/0055605 A1 | 3/2011 | Jackson | |

* cited by examiner

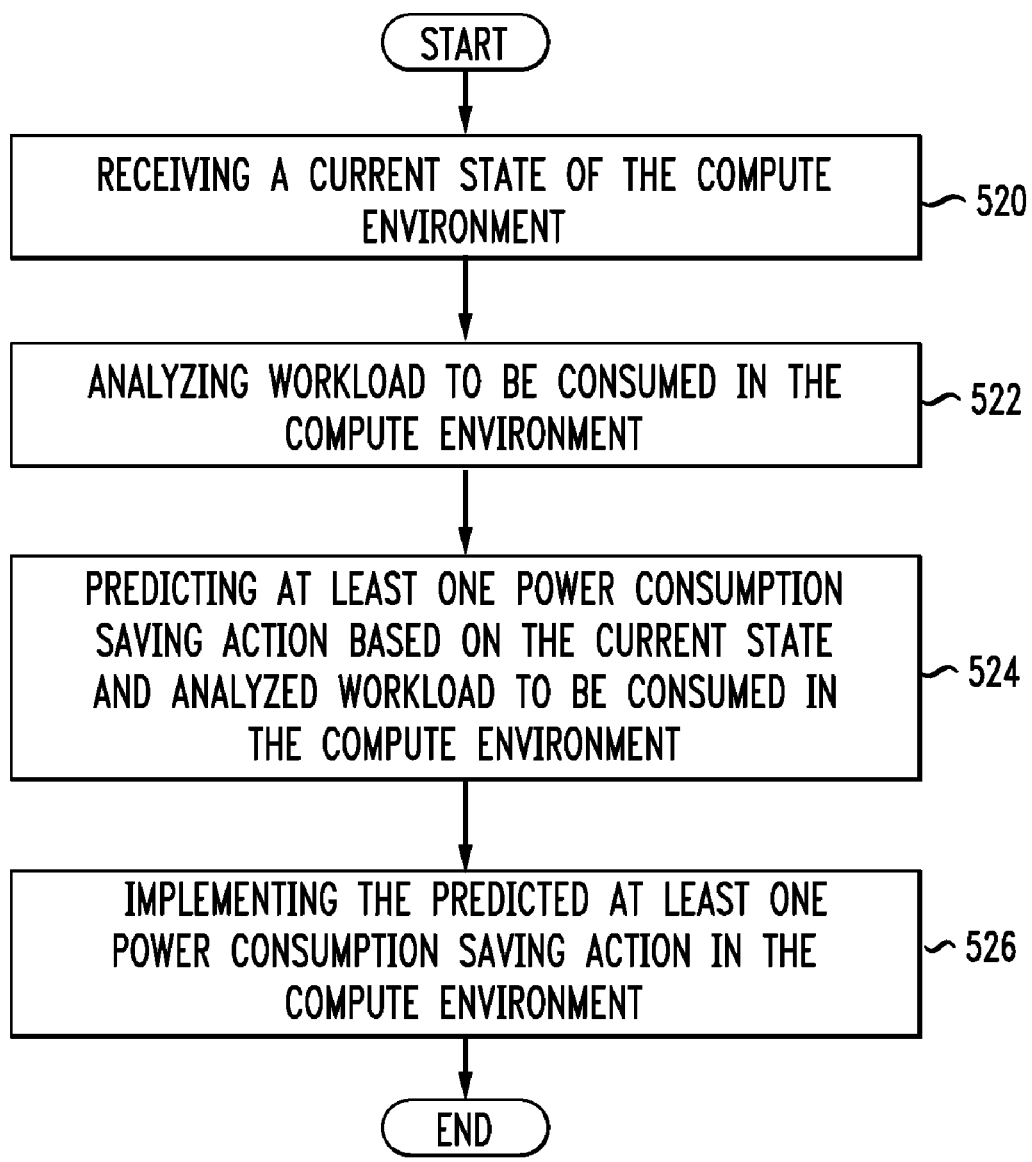

SYSTEM AND METHOD FOR MANAGING ENERGY CONSUMPTION IN A COMPUTE ENVIRONMENT

RELATED APPLICATIONS

The present application is related to the following U.S. patent application Ser. No. 10/530,582, filed Aug. 11, 2006; application Ser. No. 10/530,581, filed Aug. 11, 2006; application Ser. No. 10/530,577, filed Mar. 11, 2005; application Ser. No. 10/530,576, filed Mar. 11, 2005; application Ser. No. 11/718,867, filed May 8, 2007; application Ser. No. 10/589,339, filed Aug. 11, 2006; application Ser. No. 10/530,578, filed Mar. 11, 2005; application Ser. No. 10/530,580, filed Mar. 11, 2005; application Ser. No. 10/530,575, filed Feb. 4, 2008; application Ser. No. 11/276,856, filed Mar. 16, 2006; application Ser. No. 11/279,007, filed Apr. 7, 2006; and application Ser. No. 12/023,722, filed Jan. 31, 2008 filed previously to present application. The content of each of these applications is incorporated herein by reference in its entirety.

PRIORITY CLAIM

The present application is a divisional of U.S. patent application Ser. No. 12/179,142, filed Jul. 24, 2008, which claims the benefit of U.S. Provisional Application No. 61/046,636, filed Apr. 21, 2008, the content of which are incorporated herein by reference in their entirety.

BACKGROUND

1. Field of the Disclosure

The present disclosure relates to managing a compute environment and more specifically to a system and method of managing energy consumption within a compute environment such as a cluster, grid or on-demand center.

2. Introduction

Managing consumption of resources in a compute environment such as a grid, cluster farm, or on-demand server is a complex and challenging process. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task. The term compute resource generally refers to computer processors, memory, network bandwidth, and any of these peripheral resources as well. A compute farm may comprise a plurality of computers coordinated for such purposes of handling Internet traffic. For example, the web search website Google® uses a compute farm to process its network traffic and Internet searches.

Grid/cluster resource management generally describes the process of identifying requirements, matching resources to applications, allocating those resources, and scheduling and monitoring grid resources over time in order to run grid applications or jobs submitted to the compute environment as efficiently as possible. Each project or job utilizes a different set of resources and thus is typically unique. For example, a job may utilize computer processors and disk space, while another job may require a large amount of network bandwidth and a particular operating system. In addition to the challenge of allocating resources for a particular job or a request for resources, administrators also have difficulty obtaining a clear understanding of the resources available, the current status of the compute environment and available resources, and real-time competing needs of various users. One aspect of this process is the ability to reserve resources for a job. A cluster manager seeks to reserve a set of resources to enable the cluster to process a job at a promised quality of service.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable, although they have different connotations. For example, when a grid is referred to as receiving a request for resources and the request is processed in a particular way, the same method may also apply to other compute environments such as a cluster, on-demand center or a compute farm. A cluster is generally defined as a collection of compute nodes organized for accomplishing a task or a set of tasks. In general, a grid comprises a plurality of clusters as shown in FIG. 1. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. The grid level scheduler 102 typically does not own or control the actual resources. Therefore, jobs are submitted from the high level grid-scheduler 102 to a local set of resources with no more permissions than that user would have. This reduces efficiencies and can render the resource reservation process more difficult.

The heterogeneous nature of the shared compute resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals ranging from optimizing the performance for a single application to getting the best system throughput or minimizing response time. Local policies may also play a role in performance.

As the use of on demand centers and new Internet services such as additional music downloads and video on demand and Internet telephony increases, the number of servers and nodes used within the Internet will continue to increase. As the number of servers increase in on demand centers, grids, clusters and so forth, the amount of electricity used by such servers also increases. Estimates of the total amount of electricity used by servers in the U.S. and the world have been made by combining measured data and estimates of power used by the most popular servers within data on an installed base. Many of recent estimates have been based on more detailed data than previous estimates. Policy makers and businesses are beginning to notice and are attempting to address these issues in the industry.

Aggregate electricity used for servers has doubled over the period from the years 2000 to 2005 both in the U.S. and worldwide. Most of this growth was the result of growth of the number of less expensive servers, with only a small part of that growth being attributed to the growth in the power use per unit. For example, total power used by servers represented about 0.6 percent of total U.S. electricity consumption in 2005. However, when cooling an auxiliary infrastructure is included, that number grows to 1.2 percent, which is an amount that is comparable to that for televisions. The total power demand in 2005, which includes the associated infrastructure, is equivalent to about five 1000 MW power plants for the U.S. and 14 such plants for the world. The total electricity bill for operating these servers and associated infrastructure in 2005 was about 2.7 billion dollars for the U.S. and 7.2 billion for the world. Accordingly, what is needed in the art, is an improved mechanism to manage power consumption in compute environments such as clusters and grids or those that are similarly configured.

SUMMARY

Additional features and advantages of the disclosure will be set forth in the description which follows, and in part will be obvious from the description, or may be learned by practice of the principles disclosed herein. Various features and advantages may be realized and obtained by means of the instruments and combinations particularly pointed out in the appended claims. These and other features of the present disclosure will become more fully apparent from the following description and appended claims, or may be learned by the practice of the disclosed principles as set forth herein.

The disclosure relates to systems, methods and computer-readable media for managing the use and consumption of compute resources, reservations and/or jobs within a compute environment such as a grid or a cluster to reduce power consumption. One embodiment is the compute environment itself that runs jobs according to the principle disclosed herein.

The present disclosure addresses the issue of power consumption in the high performance computing context. Aspects of the disclosure enable the reduction of both direct (compute nodes) and indirect (chiller, support server, etc.) power consumption while maintaining either full cluster performance or adequate service level agreement (SLA)-based cluster performance. All facilities operating on these principles should be enabled in a manner that is both flexible and completely transparent to both the end users and the workload Other achievements according to the disclosure provided herein include providing extensive reporting and charting facilities to administrators and managers to allow customers or administrators to understand how the compute environments are being used and how power is being consumed on a particularized basis. Furthermore, the system enables actions to be taken to reduce overall power consumption. Chargeback mechanisms are also enabled to allow cost modeling information to be routed back to the decisions of both the end user and scheduler.

There are four primary components that are disclosed herein. First, there are mechanisms to monitor resource state, particularly in the context of power and temperature. Secondly, reporting mechanisms report the state in terms of power and temperature. Next, the system interfaces with power management facilities such as the ability to power a node on or off or enable a sleep state. Finally, intelligent policies are disclosed that provide for the ability to control power consumption.

Embodiments of the invention include systems such as a server running a workload management software that communicates with resource managers and other facilities to enable improved power consumption, particular methods that provide for improved power consumption, a high performance computing environment such as a cluster grid or on-demand center that operates according to the principles disclosed herein, as well as workload management software stored on a computer readable medium that controls a computing device or computing devices to enable improved power consumption according to the principles disclosed herein. For example, workload management software includes the Moab® branded products from Cluster Resources, Inc.

As discussed above, there are various embodiments which may be covered. However, the fundamental functionality of the disclosure shall be discussed in terms of the method embodiment. Of course, the method may be implemented in an on-demand environment, by a server or servers operating workload management software, or may be stored on a computer readable medium that stores instructions for controlling a computing device to perform the various functions to improve power consumption in a high performance computing environment.

There are four primary components associated with improved power consumption in high performance computing (HPC). Disclosed are various mechanisms for implementing one or more power consumption actions in the environment. These are shown in FIG. 3. First, a system 304 (such as a workload manager running on a node that communicates with the compute environment) monitors 302 a resource state or states in a compute environment 300. This may be done in any number of ways. Fundamentally, the concept involves monitoring the power used by a particular resource in a compute environment as well as its temperature. Thus, the system 304, for example, monitors 302 a particular node in a cluster for its power consumption as well as its temperature, which information is utilized as discussed below in intelligent policies to control and manage the distribution and timing of workload views by that particular node. Next, a module is configured to report 306 the resource state. This also involves the basic information regarding power consumption and temperature for a particular resource. The reporting aspect involves organizing the monitored information in a particular way to enable helpful reports of a particular nature as shall be discussed in more detail below. Next, another component is an interface 312 to power management facilities 308. This is useful such that workload management software 304 can provide instructions to the various facilities that are involved in power management such as powering a node on or off. Finally, another component 304 involves the mechanism to enable intelligent policies to control the power consumption 312, 310. The intelligent policies preferably operate in connection with workload management software 304 that receives requests for reservation of resources and manage the receipt and distribution of jobs 310 for consumption in a compute environment such as a cluster grid, on-demand center, server farm, etc.

The principles disclosed herein can provide a number of energy saving benefits to any compute environment. For example, the principles can maximize server workload to boost performance per watt by using both traditional workload packing and virtualization technologies. These principles take advantage of every opportunity to consolidate workload from underutilized servers onto fewer servers. Another benefit is that the principles can automatically place idle servers into standby or sleep mode which can help reduce power consumption by as much as 50% on those servers. The system can even turn such idle servers completely off for even greater energy savings. In another aspect, the workload manager 304 moves workload to allow hot servers to cool down. This mechanism enables temperature-aware workload scheduling and shifts workload away from overheated servers so that they can cool down on their own and thereby reduce the demand on cooling systems.

The system can route workload to the most energy efficient servers by using tools that gather temperature, node utilization and energy consumption statistics. The system can route workload to the most energy efficient resources to help achieve the highest possible performance per watt consumed. Another benefit enables the system to take advantage of off-peak hours by automatically scheduling lower priority workload for processing during off-peak hours when energy costs are lower, while ensuring that QOS guarantees are met. Next, another benefit is that the workload manager 304 can send workload to locations with the lowest energy rates, taking into account start-time constraints, data transmission times, service level agreements and other factors. Finally, another benefit of the principles disclosed herein is that the workload manager operating according to these principles can place the user in charge and provide advance tracking, modern training and reporting capabilities enabling one to manage and document an organization's energy efficiency and achieve green-computing objectives. The system can also potentially give the user the ability to track carbon credits or other statistics for charge back and reporting purposes.

A method embodiment for managing workload includes receiving information associated with at least one of energy consumption and a temperature of nodes in each data center of a set of distributed data centers to yield received information. The method also includes analyzing workload associated with at least one data center of the set of distributed data centers to yield an analysis of the workload, and modifying use of resources of the set of distributed data centers based on the received information and the analysis of the workload. The received information can relate to energy consumption, which can be associated with any component of a node, such as a processor, a processor core, random access memory, a storage device, and/or a cooling device, or other components.

Modifying a node can relate to powering up a node, powering down a node, placing the node in a sleep state, or performing some other power consumption saving action. These actions can include such actions as powering down memory, spinning down a disk, lowering the clock speed of a processor, powering down a hard drive, and/or placing a resource in a low power consumption mode.

Modifying a resource in the compute environment can include migrating workload based on information related to energy, such as differing energy costs, depending on at least one of a region, a time of day, a time of year, and a cumulative amount of energy used during a certain period of time. For example, the system can migrate workload from one distributed data center to another distributed data center, where energy costs are cheaper and/or more environmentally friendly.

BRIEF DESCRIPTION OF THE DRAWINGS

In order to describe the manner in which the above-recited and other advantages and features can be obtained, a more particular description briefly described above will be rendered by reference to specific embodiments thereof which are illustrated in the appended drawings. Understanding that these drawings depict only typical embodiments of the disclosure and are not therefore to be considered to be limiting of its scope, the principles will be described and explained with additional specificity and detail through the use of the accompanying drawings in which:

FIG. 5C illustrates yet another method embodiment; and

DETAILED DESCRIPTION

Figure 1:
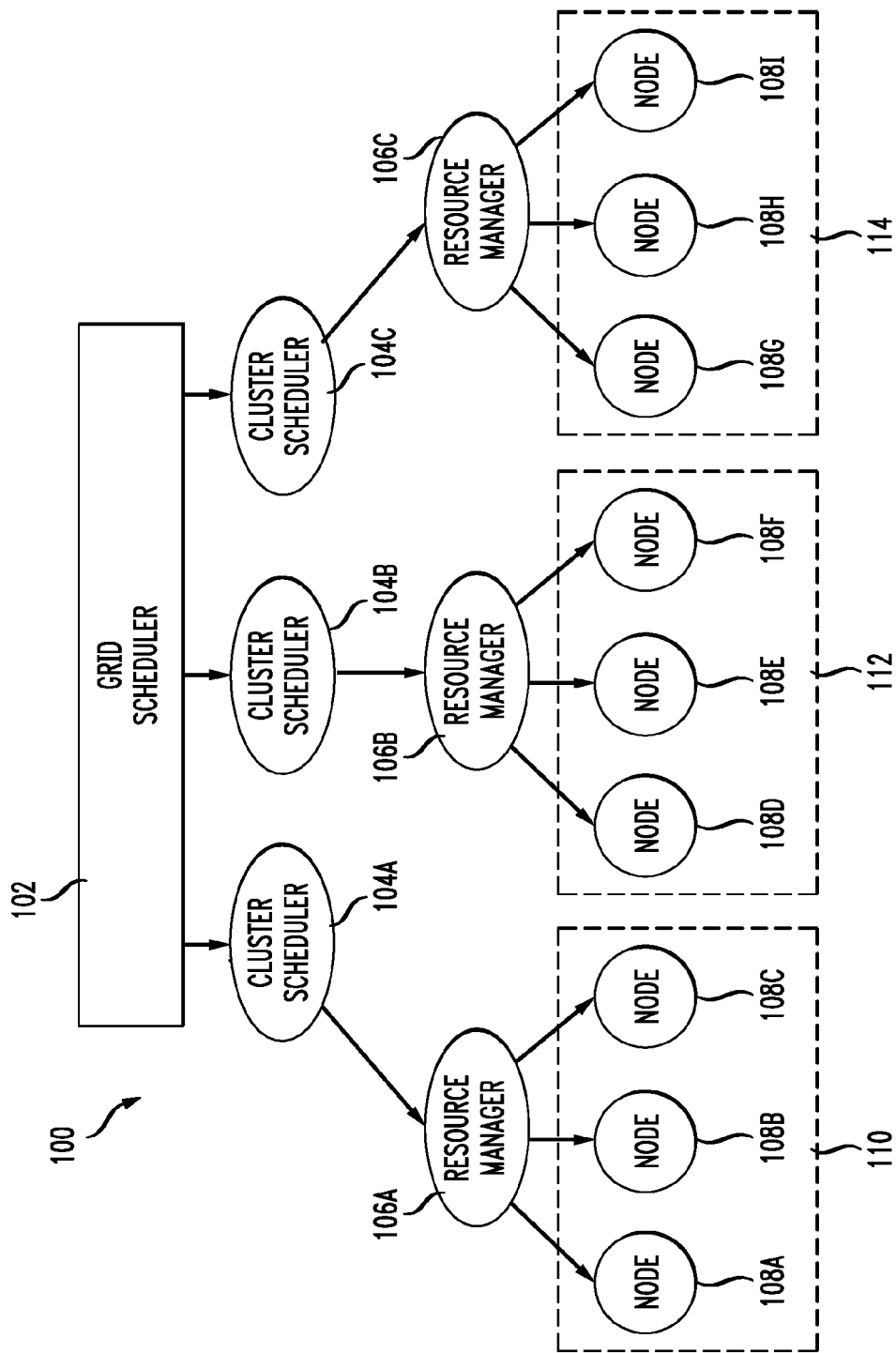
FIG. 1 illustrates generally a grid scheduler, cluster scheduler, and resource managers interacting with compute nodes within plurality of clusters.
Figure 2:
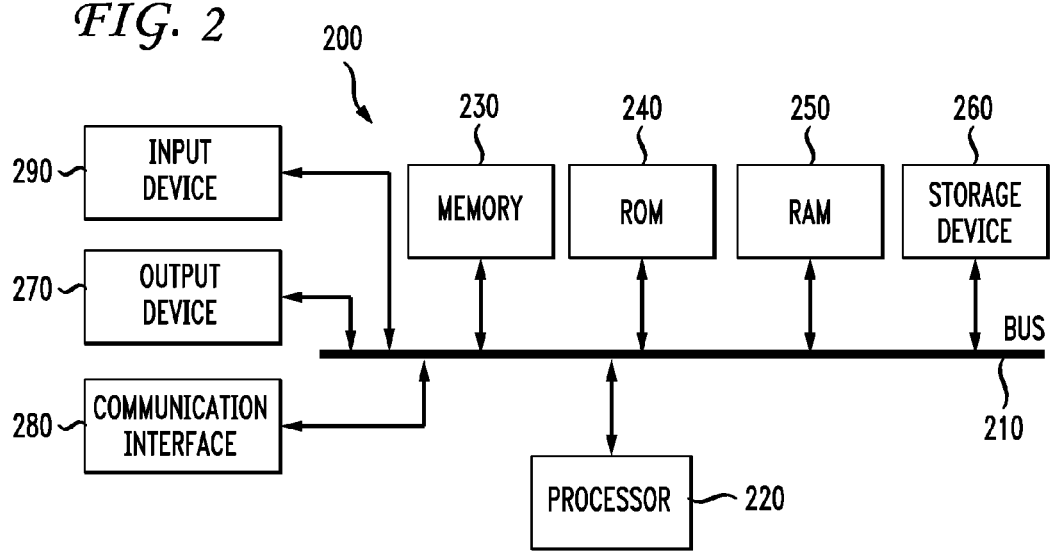
FIG. 2 illustrates a system embodiment.

Various embodiments are discussed in detail below. While specific implementations are discussed, it should be understood that this is done for illustration purposes only. A person skilled in the relevant art will recognize that other components and configurations may be used without parting from the spirit and scope of the disclosure.

With regards to the first primary component of monitoring a resource state 302 in terms of power, temperature and so forth, a module uses multi-resource management capabilities and native interfaces in order to collect at least one or more of the following pieces of information. Load "watts consumed per node" via an intelligent platform management interface (IPMI) or other low level interface is gathered. Another piece of information involves the load "CPU temperature per node" via the IPMI or other low level interface. Yet another parameter involves the load "watts consumed" for non-compute intelligent resources including chillers, storage systems, file servers, and network switches via the system network management protocol (SNMP) or other low level interface. Those of skill in the art will understand the standardized interfaces in which the data may be retrieved and monitored by software programmed or included in a workload manager.

Next, the concept of reporting resource state in terms of power and power consumption and power information as well as temperature includes the following. Various reports are capable of being generated based on the monitored information. For example, job reports are generated which include the following features: (1) per job current, minimum, maximum, average, and total power consumption; (2) per job power consumption over time; (3) per job cost in dollars (or any currency unit) due to kilowatt hour (KWH) consumed; and (4) per job average temperature of allocated resources. Of course, these concepts as well as other parameters may be utilized to provide information with regards to power consumption on a job-by-job basis. In this regard, a report can come back to a user or administrator that a particular job, in terms of its power consumption, consumed a certain amount of power. This information may be utilized by a workload manager 304 to analyze various information in order to make intelligent decision with regards to how to submit that job into the compute environment for consumption. For example, the report may provide comparisons of energy consumption for the job versus if the job were processed differently or at a different location. Where multiple operational goals exist, such as the lowest overall cost or the least use of active cooling, the report can include multiple suggested configurations to optimize for each operational goal as well as a suggested optimal configuration blending each operational goal.

Next, job template reports may also be provided. Job template reports may provide information in the following parameters: (1) per job current, minimum, maximum, average, and total power consumption; (2) per job power consumption over time; (3) per job cost in dollars (or other currency value) to KWH consumed; (4) per job average temperature of allocated resources; (5) per job per node application performance; (6) per job per node power consumption; and (7) per job per node per watt most effective application performance. This information from a job template report can provide additional details regarding performance for a particular application (software application, operating system, and so forth) and a more detailed analysis of power consumption on a per node basis for a particular job. This information also may be utilized for improving the distribution of workload in order to improve power consumption while maintaining the standards promised under an SLA.

Another reporting capability includes credential reports. Credentials involve such parameters such as user, groups, projects or accounts, classes or queues, and/or quality of service (QOS and SLA). These enable a different type of view with regards to power consumption based on a credential parameter. This enables an administrator or user to identify that the workload submitted by a particular type of credential has power consumption that is average, above average, below average or in need of improvement. For example, parameters which can be included in a credential report include: (1) per credential current, minimum, maximum, average and total power consumption; (2) per credential power consumption over time; (3) per credential cost in dollars (or other currency due to KWH consumed); and (4) per credential temperature of allocated resources.

Another type of report which can be generated includes a node report. A node report, as its name suggests, provides information and data with regards to the use and consumption on a per node basis. Parameters include: (1) per node current, minimum, maximum, average and total power consumption; (2) per node power consumption over time; (3) per node cost due to KWH consumed; and (4) per node current, minimum, maximum, and average temperature.

Another report which can be generated involves a partition report. Partition reports cover, on a per partition basis, at least the following parameters: (1) per partition current, minimum, maximum, average and total power consumption; (2) per partition power consumption over time; (3) per partition cost due to KWH consumed; (4) per partition current, minimum, maximum, and average temperature; and (5) per partition actual versus non-green versus maximum power consumption over time. These parameters enable information to be provided with regards to partitions that are created within a compute environment for consuming workload.

With regards to the interfacing to power management's facilities, at least the following actions are available for use in managing the power in the compute environment. Power management facilities include the ability to power a node on, power a node off and enable a sleep state such as a Linux sleep state. There may be other sleep states which may be enabled to power down or reduce the power consumption for a node or another resource that is not currently being used. For example, any facility that provides for a hibernation state which turns down everything possible but still maintains a synchronization state. Another power management facility includes the ability to place a resource in a low power standby or sleep mode. These management facilities are controlled as directed by a workload manager in order to both maintain promised levels of service according to an SLA as well as maximize the efficiency in terms of power consumption for the compute environment.

At the time of the filing of the present application, newer servers are beginning to provide some power management capabilities independently and internally. For example, servers may include their own management software that allows them to turn off. This is primarily based on local knowledge. An aspect of this disclosure relates to providing these management capabilities or APIs externally so that they may communicate with both power management facility 308 and a workload manager 304 and receive instructions for power management purposes. In this regard, a system may be able to tap into and possibly even shut down particular portions of memory. For example, the system may instruct a node to run in a low memory state. So even thought it may have 4 gigabytes of RAM, the workload manager 304 may instruct a particular node to restrain itself down to one half gigabyte of RAM and stay in this hibernation state if the workload is small or larger. Then, since the memory consumes a fair amount of power, the implemented memory restraint reduces power consumption. In another example, the management software may be able to lower a clock speed of individual processors or turn off particular processors or cores, power down hard drives, spin down peripherals such as DVD-ROMs, or other types of interfaces. In other words, any power consuming component of the compute environment may be interfaced with a workload manager 304 that can manage and control its use. Therefore, all various connections with workload, jobs, job analysis, resource analysis and so forth may be monitored, reported and controlled according to the principles disclosed herein.

In addition to controlling these individual resources within the compute environment, an aspect of the disclosure is that all of these states are different actions that may be available on a predictive basis in which a workload manager 304 may anticipate powering down a node, or powering down portions or all of the RAM, or spinning down DVD-ROMs and so on, as a job arrives or as a reservation is received in anticipation for efficiently consuming the resources within the environment. Furthermore, adjustments may be made on a dynamic basis in which once preliminary decisions are made and workload begins to be consumed, changes within the workload, the environment, SLAs, or any other parameter may be identified and power management decisions and instructions and/or predictions may be modified as well to improve the efficiency. For example, the system may overestimate the amount of RAM needed for a job. When the actual workload is processed, the system determines that less RAM is actually needed and makes the appropriate adjustment and places more RAM into a hibernation state. The air conditioning in an on demand center may fail causing the nodes to overheat. The workload manager 304 then transfers the workload to other compute environments or make other changes to accommodate the heat, such as reducing the clock speed of processors in the overheated area. Therefore, the workload manager 304 utilizes information about a current state of the environment and workload and/or its knowledge about future workload to implement energy saving decision such as when to power down or power up any particular resource within the compute environment. Nodes may be powered down or up based on information associated with the current state and/or knowledge of the workload, both current and future, as well as predicted.

Regarding the mechanisms for managing power consumption in a compute environment 300, one example method includes receiving data about a current state of the compute environment 300. The received data, for example, may include data regarding a current workload, current temperature, current power consumption, current nodes that are in a standby mode or memory that is in a reduced power consumption mode, and so forth. Any data regarding the current state of the compute environment 300 may fall under this category. Next, the method analyzes workload that is currently consuming resources in the compute environment 300. The method next includes powering on or off or taking another power saving step for at least one resource in the compute environment 300 based on the received data and analysis of the workload. Powering off at least one resource may include placing at least one node in a low power standby mode. The at least one resource may be a node, memory, a router, bandwidth, and so forth. In another aspect, the analysis further includes an analysis of workload that is to consume the compute environment 300. Workload managers 304 receive and establish a queue of jobs that are to consume a workload. One aspect of this embodiment enables the analysis of such workload that has not yet consumed resources in the compute environment 300 but is scheduled to consume resources.

In another method embodiment, a system 304 performs the steps of managing power consumption in the compute environment 300 by receiving data regarding the current state of the compute environment, and analyzing workload to be consumed in the compute environment 300. The system predicts at least one power consumption saving action based on the current state and analyzed workload and implements the predicted at least one power consumption saving action in the compute environment. The power consumption saving action may be one of the following: powering down a node, powering down memory such as RAM, spinning down a disk, lowering a clock speed of a processor, powering down a hard drive or placing a resource in a low power consumption mode. Other power saving steps may occur as well. The system can also analyze the compute environment 300 and workload as the workload consumes resources in the compute environment 300 and dynamically adjust the implemented and predicted at least one power consumption savings action based on the analysis of the compute environment and workload. One example of dynamically adjusting the at least one power consumption saving action may include increasing or decreasing the number of powered down or powered up nodes from an implemented amount. Another example of dynamically adjusting includes increasing or decreasing an amount of powered down memory, such as RAM, from an implemented amount.

Next, the system 304 provides intelligent policies to control power consumption. For example, an idle pool management facility involves utilizing workload prediction facilities to determine when idle nodes will be required to run queued workload. The management facility also allows specification of which nodes will participate in an idle pool. For instant workload response, the method specifies of the number of idle nodes which will be allowed to remain idle and powered up when no workload is targeted, targeting node allocation for a minimum specified time frame. The system powers down in either an off or standby mode idle nodes which fall outside of established bounds. The system 304 enables node transition throttling to prevent power management thrashing (powering on and off a node, spinning up and then down a hard drive, etc.) which may affect node mean time between failure (MTBF). The system 304 also enables transparent power management hiding node, power state and state transitions from end users and workload.

Another intelligent policy is a QOS-based power management policy. Here, the system 304 allows resource pool size to be dynamically adjusted based on a per QOS backlog and response time factors. For example, in this case, some nodes can be maintained in power down mode even with queued jobs so long as the associated SLAs are satisfied. Power costing is another intelligent policy implemented in the system in which the system allows a "watts consumed" based internal workload charging against user allocations including time of day based power charging rates. An example of QOS powerbase management may be to illustrate a simple aspect of green computing and then providing a more detailed illustration of how QOS based power management may be implemented. For example, in a first tier of green computing, the system may have a job and determine to go ahead and start the nodes to run that job. The system may, inasmuch as a job is in the queue and is ready to start, simply proceed to seek to provide the user with the absolute maximum response time or throughput possible and if the nodes are going to be idle, then the system powers them off if the system has nothing targeted for a particular node. With the QOS power based management, the system provides additional intelligence to determine, if a job is in a queue and ready to process, whether to process the job at the particular time. For example, the system does not always have to run the job within a few seconds just because the resources are available. There may be cases where the power management of the compute environment 300 will improve by waiting to run a job in a particular amount of time. For example, the system may have a SLA that a particular type of organization requires a response time of 30 minutes and another type of organization requires a response time of 15 seconds. The system can insure that the various SLAs are satisfied and power resources on and off but only to the extent of satisfying the respective SLAs. Therefore, the system may have a job sitting in a queue for 20 minutes while nodes are also in a state of being powered off. While the system could power the nodes on immediately and process the workload, the system determines under the QOS power based management intelligence that, if power consumption can be improved, the system will wait to process (in this example) jobs until the appropriate time and then nodes may be powered up and the resources consumed. The system 304 may also receive outside information such as knowledge that a cold front will arrive in the area of the compute environment 300 and wait to process a heat intensive job until then.

In another aspect of QOS power based management, there may be possibilities of actually engaging in a dialog with a user if a power management threshold is met but which requires the violation of an SLA. For example, the system 304 may provide feedback to a user 314 which has an SLA that requires a response time of 15 seconds in which the system may ask for a variance from the SLA for the purpose of saving energy. This would of course be based on analysis of at least one of the compute environment, the job in the queue, the SLA, perhaps previous history and so forth. In this scenario, the system 304 may engage in a dialog which authorizes the departure from the standard SLA. It is preferable, that these kinds of details would generally be set forth in the SLA in advance. In other words, the SLA may include a typical response time of 15 seconds, but if a certain threshold of improved power consumption may be achieved by altering that response time, then the SLA can include parameters to pre-authorize such departures from the standard required response time.

Another intelligent policy involves a time of day based power consumption. Here, the system 304 allows intelligent scheduling which only executes the most time-critical workload during the most expensive "peak" power consumption periods and defers other workload to less costly periods. For example, if the most costly consumption period during a day is between 9:00 am and 12 noon, the intelligent scheduling policy may identify a job or a queue of jobs and execute the most time critical workload during this time period because the time critical workload must be processed and the trade-off is in the balance of processing the workload over paying less money for power consumption. Then, other less critical workload may be processed for example, during a lunch period from 12-1 pm or later in the middle of the night in which less expensive power costs are available. Knowing that a charge rate associated with a particular environment and actually being able to bill back users, which may be individual users or larger system users or departments, may have some unit of credit that allows them to use the compute resources. For example, the concept of power costing allows some of these credits to be consumed directly based on the wattage of the workload. Thus, the system 304 may provide a normal costing factor associated with using the compute resources. For example, the system 304 may allow the raw use of the environment because the system has allocated that a particular use is going to use a certain number of credits per processor second. In addition, the user can also be charged for the actual power consumed. Therefore, this aspect of the disclosure seeks to model the cost structure of the data center or the high performance computing (HPC) cluster 300 and the power costing approach to basically model the use of energy and charge users for that.

Another intelligent policy includes temperature based workload distribution. Here, the system allows node allocation policies to distribute workload to balance heat dissipation and thus average node temperature within the data center or cluster. Here, utilizing the monitored information with regards to temperature, the workload manager can actually distribute workload to particular nodes within the cluster that are running cooler rather than nodes that are running hotter. Thus, the system can intelligently send "low heat" workload, based on automatic learning or other mechanisms, to high temperature nodes to balance the data center heat distribution. For example, certain jobs may be I/O specific and require a lot more data throughput over the network. Other jobs may be very processor specific as well as some that may ramp up use and requirements on memory. Thus, different jobs and different workload have different resource consumption profiles and thus, different power consumption profiles. Another example is a heterogeneous compute environment including power efficient ultra-low voltage (ULV) processors and standard processors. ULV processors can handle constant 100% CPU utilization with very little heat generation where a standard CPU would generate considerable heat under the same workload. The same job may incur different heat-related characteristics depending on which hardware in the same location is processing the job. Therefore, the analysis by the system 304 includes making energy conservation decisions based on knowledge of each CPU and its heat generation characteristics.

Basically, the workload manager learner capability would use such information to profile an application or particular type of workload and discover what type of power consumption profile it has. Once the system 304 determines the power consumption profile, the system can look to the data center to determine what additional heat will be added to the data center 300 when processing that workload. The system 304 can determine what the overall additional heat to the center is going to be. In this way, the system 304 can determine whether the data center 300 is going to over heat and thus take the compute environment outside of an authorized temperature range. The system can actually determine on a node-by-node or partition basis if there is a cooler physical part of the data center. In this case, the monitored states may be of course utilized and analyzed such that the workload manager can actually place the particular workload within one of the racks or next to a particular chiller or cooling unit 316 such that as the resources in the environment get consumed, the workload manager 304 can balance the resulting temperature increase. This is of course a cost saving because the designer and purchaser of the compute environment does not have to over purchase or over bill the cooling system because the workload management system 304 is intelligent enough to prevent it from ever reaching outside of a particular temperature threshold. This is a one example benefit of the principles disclosed herein that is a direct cost savings to those owning and operating such compute environments.

Next, another concept associated with the above job migration is that perhaps the system cannot run a job at the current time. Perhaps the workload management software 304 may determine not to run the job now and identify a location and a time in which the job can start so as not to exceed the total temperature threshold, wattage threshold or BTU threshold that the system is trying to maintain as a target. Thus, while temperature is primarily discussed above, a wattage threshold and BTU threshold may also be the parameter against which decisions are made with regards to placement of workload in the compute environment as well as job migration.

In another aspect of the disclosure, an intelligent policy may be implemented by the workload manager 304 in which job migration may be employed. An example of this aspect involves determining when a running job generates more heat than was expected. If certain thresholds are passed with the acceptable level of heat, the workload manager 304 actually migrates a live job over to a new and cooler location. There may be several scenarios in which this is applied. For example, the job or workload may not have a profile and thus the best and most accurate prediction of the heat generated by that job may have been incorrect and thus modifications require the migration of the job to a new location. In this regard, another aspect involves therefore generating a workload profile that may be then stored and utilized at a later date in order to improve the distribution of workload for a later submitted job that may have the same or similar profile.

Furthermore, another interface to power management facilities 312 may enable a workload manager 304 to also interface with heat management facilities such as air conditioning or chilling units 316. Thus, if based on data received, the system knows that it will be sending workload to high temperature nodes which may further increase their temperature according to certain parameters and thresholds, the system may instruct the air conditioning unit or chilling facilities 316 to also increase in order to accommodate the anticipated or actual current increased temperature. The system 304 may also instruct the air conditioning unit or chilling facilities to direct cooling to particular portions of a building or server room by remotely controlling ductwork or vents, for example, to direct more cool air to travel to the hottest nodes. In this regard, very localized management of temperature may be coordinated through such control of ductwork, fans, etc. by the system 304.

Another aspect of the disclosure with regards to temperature involves temperature based responses. Here, the system would allow temperature thresholds to preclude the allocation of excessively "hot" nodes and further may provide temperature thresholds to dynamically initiate automated actions or notifications. As noted above, the automated actions may involve either the compute environment itself or the temperature control facilities which are in place in a data center or compute environment. Furthermore, of course, notifications may be provided to users or administrators to warn them of excessive heat or dangerous circumstances.

An example of a temperature-based response would be to use the generic metric capability associated with the workload manager 304. Here, one of the metrics utilized in determining workload is processed is to add temperature as a metric. Thus, the workload manager 304 may place as a default parameter on the workload that says that the workload can only use nodes that have a temperature lower than a particular threshold temperature X. In this regard, it becomes a standard generic metric enforcement in terms of distributing the workload into the compute environment 300. A second aspect if a trigger action that also may operate on the generic metric heating and establish a threshold. Therefore, the concept of utilizing temperature, wattage or a BTU threshold into the previously used generic metrics provides the capabilities of improving and providing a temperature, wattage or BTU based response when processing workload in the compute environment.

Another intelligent policy enabled by the system is a power based workload packing policy. Here, the system allows job packing to optimize workload placement and to allow the maximum number of servers to be placed into an idle or standby mode and thus minimize total power consumed. Here, the system may implement job migration (using virtual machine or check restart based mechanisms) to improve packing of existing active workload. As an example of a packing policy, assume that the system 304 manages a 16 core machine in the compute environment. It may make sense for the system to pack up that machine because the difference between the machine that has a 1 core running and a machine that has 2 cores running versus two machines that have 1 core running each is that there is a significant power savings in packing them onto that one machine. So previously, system algorithms would spread the workload out so as to minimize the conflict and maximize performance of every individual job. Now, the improved system 304 includes power saving attributes in the algorithms. Therefore, while the workload manager 304 still desires to maximize the performance, it may also determine if there is a cost and the system 304 adds a balancing of the cost of power consumption against the mild performance improvement of maximum distribution. Also included in this concept is the understanding of the power consumption policies and power management opportunities. Therefore, if the system packs workload onto a 16 core machine, and if the system uses a tight packing algorithm, it enables in the compute environment 300 more cores and other resources to be powered off and provides larger savings through job migration. Basically, the system runs more jobs on less nodes and powers down the other nodes that otherwise might have workload distributed on them.

Therefore, an example of the application of this concept is if job A and job B both run on the same node, the user may experience a 3% degradation of performance because of the sharing aspects of the compute environment, but if job A and job B are separated on two separate nodes, then this may increase the power consumption by 20%. The balancing algorithm then determines whether it is appropriate to have performance degradation in exchange for power savings.

Next, another intelligent policy disclosed herein is a power effectiveness packing policy. Here, the system 304 allows automated learning of per-application performance on a node-by-node basis. This allows the correlation of application performance and power consumption to identify the most effective application to node mapping for the workload. Here, the system also uses mapping information to intelligently shift workload to optimal nodes. Automated learning involves identifying for each application or workload how many certain numbers of units of work are required to process that application. Each application will have some number of work so as it runs on different types of hardware it will run at varying speeds. The system 304 basically measures per node performance or how well the application executes on this particular resource. Once the system 304 knows this information, the system can actually correlate performance to power consumption. Previously, systems 304 primarily determined performance simply as a measure of a unit of time. In other words, how many processing widgets is the system able to accomplish per second. Now, the system 304 looks at the consumption of resources differently and asks how many widgets per kilowatt power are consumed. Therefore, the concept becomes a unit of work and then the system 304 implements a larger algorithm that analyzes both turn around time as well as power consumption together to figure out the total cost of a particular job. Thus, the most effective and efficient processing of an application is now based on power plus turn around time. Therefore, the allocation infinity algorithms operated by the workload manager 304 may enable the system to wait a little longer to obtain the best node or another different kind of best and most efficient resource within the compute environment.

Figure 4:
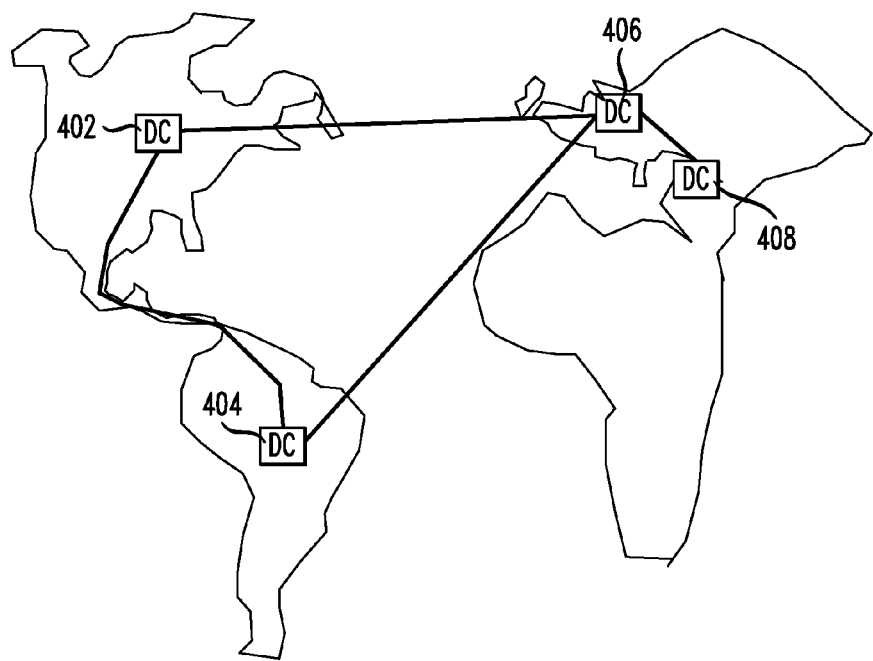
FIG. 4 illustrates a migration application from one jurisdiction to another.

Another intelligent policy to control power consumption involves green grid management. Here, the system utilizes watt-centric charging information to migrate workload to a least expensive data center based on persistent and/or time of day based charge rates. This is shown in FIG. 4. In this regard, the system may balance features such as SLA requirements, and the delay in cost involved in migrating workload from one data center to another and make intelligent decisions with regards to migrating workload. For example, a data center in North America 402 may have temperature or power consumption or cost issues and an analysis may automatically be performed in which a data center in South America 404 may have less expensive power consumption and capacity for taking on additional workload. In this regard, the green management module can migrate workload from a data center in North America 402 to a data center in South America 404 for consumption. Other data centers 406, 408 can also of course be networked and made available. The increased value of processing the job or the workload in the South America facility will outweigh the delay and costs and resource consumption in terms of bandwidth necessary to migrate the workload to the new on-demand center.

In another example, assume that a data center located in England 406 is operating and it happens to be peak use hours in England and thus, the price being charged is quite high. Not only is this data center charging a lot for the raw power but perhaps the users are taxed if they use more than 60,000 kilowatt hours that day in the data center. In some jurisdictions, a special tax may ensue to charge the users more. Therefore, the workload manager 304 communicates with these various data centers and if the centers are connected via a grid located in North America 402 or South America 404, an analysis can be performed in which the cost in dollars as well as perhaps power consumption and time can be analyzed to determine whether it is more efficient according any of these parameters or any combination thereof to migrate the job to another data center. Even though there are costs associated with migrating the data and the workload, the savings may actually outweigh the costs. Thus, the data center 406 in England may outsource its workload to other locations which, at the same time of day in England will be during off hours in the other jurisdictions. Because a location is on the other side of the world, it may be the middle of the night or very early in the morning and the power is just cheaper during that time. Thus, the system can manage outsourcing certain workload and particularly workload that is not response time intensive and which also may not be of high security or relatively as high value. Therefore, this type of workload can be pushed to a lower power consumption environment, enabling the users to stay under various thresholds and operate according to the desired models. In yet another aspect, workload can be moved based on weather conditions such that predicted storms can be avoided or data centers in cooler areas can process the workload to reduce the need for cooling energy.

Another benefit to this particular approach in terms of managing the consumption of workload based on power consumption is that with a high cost of oil, there is often an enormous cost in moving fuel from one place to another simply in order to run power plants. Therefore, there may even be mechanisms to place data centers near the source of power such as near power plants and seek to minimize the cost of such power and maximize the use of such data centers for migrated workload.

Figure 3:
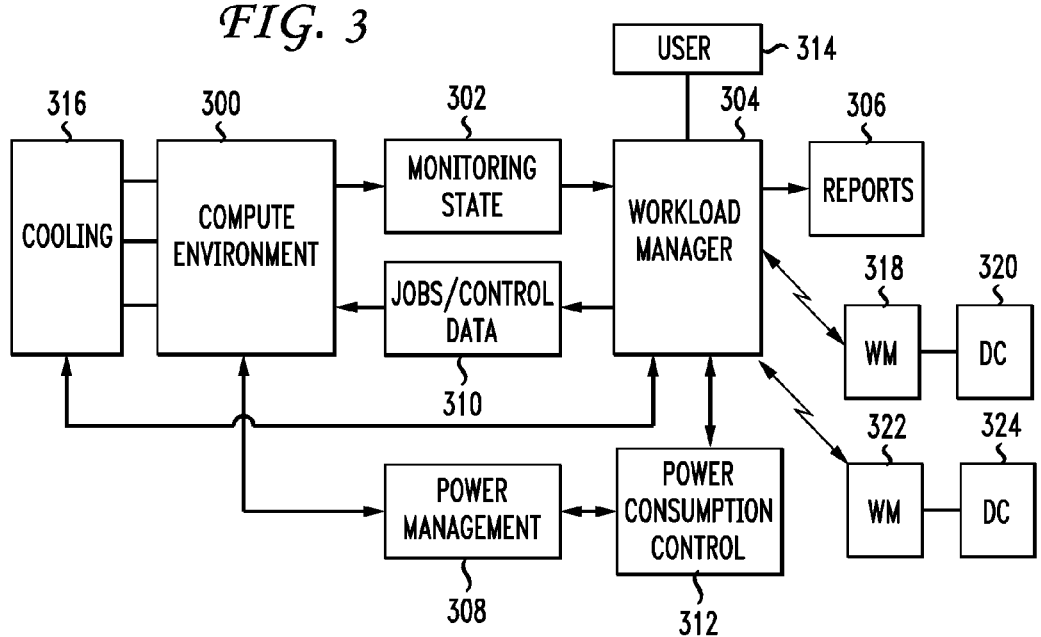
FIG. 3 illustrates the basic components for green computing.

With regards to the concept of job migration across jurisdictions, we note that some aspects of the method can be practiced as though the method if being practiced in a particular jurisdiction. For example, the data center 402 in North America may view the data centers in other parts of the world as though it is from a black box. Here, state information can be received from the other data centers with regards to their cost per kilowatt of power, their peak consumption, their availability for processing workload, and so forth. Such information can be retrieved from sister workload managers (318, 322, FIG. 3) or a same workload manager that receives the data for data centers (320, 324, FIG. 3, or DC's in FIG. 4) in geographically distant locations. Thus, a workload manager associated with data center 402 can receive state information for data centers 404, 406 and 408. An analysis can be performed balancing the power consumption, cost, individual cost for migration of data and workload to each of the different data centers and so forth. Thus, a workload manager associated with data center 402 can therefore, based on its affinity algorithms, determine which of the other data centers provides the most efficiency for migrating and consuming the resources there. In this regard, assuming that a data center in England 406 is identified as the cheapest due to the off peak hours which would provide the cheapest cost of fuel, the workload manager associated with data center 402 acts and outsources the workload to data center 406. Following the consumption of the resources in data center 406, workload manager for the data center 402 then receives the results in terms of data received from the data center 406. There can be various mechanisms by which the state information for each of the data centers can be retrieved and utilized. In other words, there can be a single workload manager or multiple workload managers that manage the state information and implement the algorithms which appropriately distribute the workload and if necessary make job migration decisions. Again, it is preferable that these decisions with regard to where the workload is processed are preferably transparent to the user that submitted the workload. Thus, the user, to his or her knowledge, simply submits workload to a local compute environment, but through the policies and communication between various data centers, the workload migrates and is processed at a location far distant from the data center which originally received the reservation or request for resources.

Figure 5A:
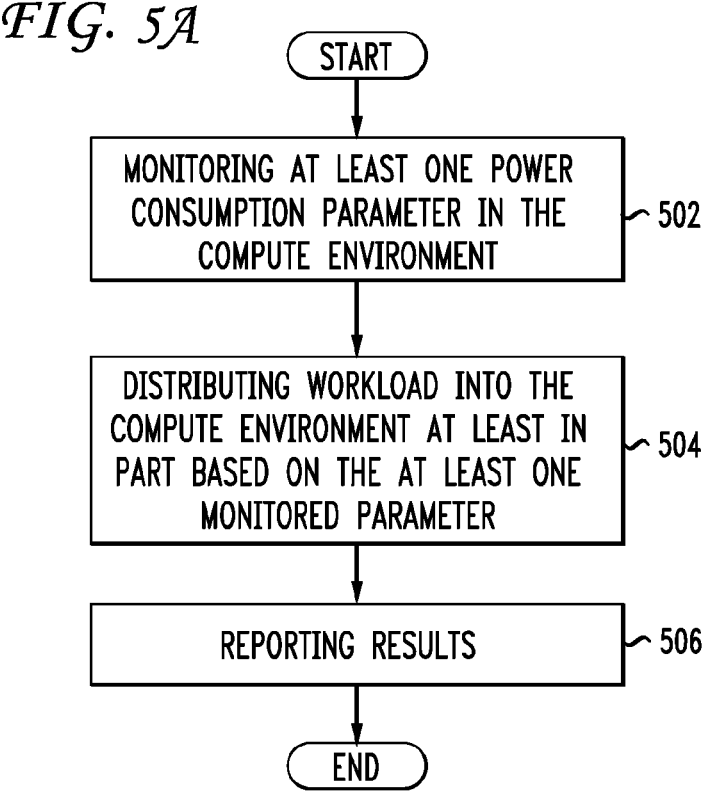
FIG. 5A illustrates a method embodiment.

One embodiment relates to a method of managing the consumption of resources within a compute environment. FIG. 5A illustrates the basic steps involved in the practice of the method. As shown, the method includes monitoring at least one power consumption parameter in the compute environment (502), distributing workload into the compute environment at least in part based on the at least one monitored parameter (504) and reporting results (506).

As can be appreciated these represent several basic steps in the process of efficiently managing a compute environment. It is understood that many of the data points regarding power consumption and temperature can be monitored and reported and both the compute environment and many power and temperature related functions in the compute environment including cooling facilities 316 can be controlled and managed via workload management software 304. Accordingly, multiple method embodiments are disclosed herein.

Another intelligent policy enabled by the disclosure herein involves power limits and caps. Here, the system enables a per day or total wattage limit or cap on a per user, group, project, department, job, etc. basis. Thus, any parameter such as a credential and so forth can be particularized and assigned a power or temperature limit or cap. Another aspect involves power prioritization. Here, the system can prioritize "green" workload during the most expensive time-of-day periods. In this regard, the system analyzes the actual workload to determine the power consumption that will likely be needed in order to process that workload. Here, if a particular job or workload is anticipated not to utilize as much power as other workload, then the system can prioritize that workload during the most expensive time of day periods. As an example of prioritizing green workload, the system 304 can perform an analysis for the workload to identify that a particular workload will use a low amount of energy such that such workload can be processed during the most expensive time of day. Here, the algorithm can be to give a particular workload a time based affinity based on attributes related to the power consumption for that particular workload.

Figure 5B:
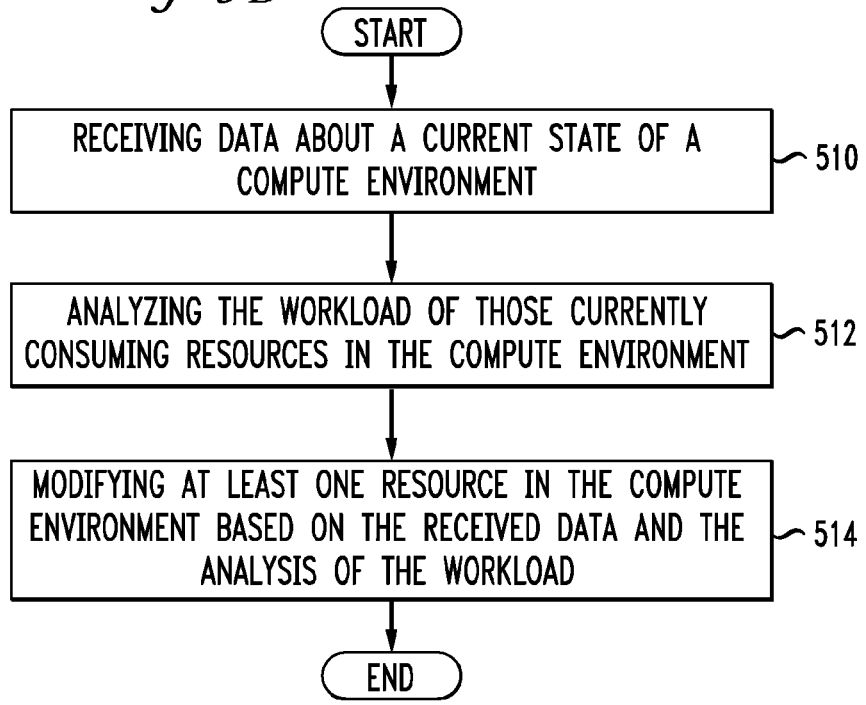
FIG. 5B illustrates another method embodiment.

FIG. 5B illustrates another example method. In this example, the method is for managing power consumption in a compute environment. The method includes receiving data about a current state of a compute environment (510). Next, the system analyzes the workload of those currently consuming resources in the compute environment (512) and modifies at least one resource in the compute environment based on the received data and the analysis of the workload (514). The modification is related to energy consumption. In this context, the resources within the compute environment not only include the compute resources such as processors, memory, bandwidth, disc space and so on but also can include environmental resources such as air conditioning units, fans, ducts, controls of air flow, windows, electricity provided to the environment and so forth. Therefore, the concept of modifying at least one resource in the compute environment encompasses all of these various components within the entire compute environment. For example, modifying at least one resource in the compute environment can involve placing at least one node in a low power state or powering on or off at least one node. Modifying at least one resource in the compute environment can involve increasing the air conditioning in order to maintain the temperature in the entire compute environment or in a portion of the compute environment at a particular level. Modifying the compute environment in this case can involve directing the air conditioning units or cooling facilities to increase cooling in particular portions of the building or server room by remotely controlling duct work or vents, for example, in order to direct cool air to the hottest nodes or to a particular portion in the environment.

The method can also further include analyzing future workload that will be consumed in the compute environment and wherein the step of modifying the at least one resource is based on the received data and the analysis of the current workload and the future workload.

FIG. 5C illustrates another example method embodiment. Here, the system manages power consumption in the compute environment by receiving a current state of the compute environment (520), analyzing workload to be consumed in the compute environment (522) and predicting at least one power consumption saving action based on the current state and analyzed workload to be consumed in the compute environment (524). The algorithm looks to future workload that is scheduled to be consumed in the compute environment and makes a prediction of at least one power consumption saving action based on that current state as well as the analyzed workload. For example, within the queue of jobs, a job can exist that is scheduled to consume resources in the environment that is predicted to be highly heat intensive. In this case, the at least one power consumption saving action can involve adjusting the distribution of the workload such that efficient ultra-low voltage processors can be used rather than standard processors. Furthermore, additional actions can be taken that are not purely based on power consumption but based on temperature. For example, knowing that a heat intensive workload is scheduled to consume resources in the environment, the system can introduce increased cooling into the compute environment or a portion of the compute environment where such workload is to be processed. In this regard, it can save energy to pre-cool the environment rather than waiting for nodes to increase their heat dissipation and then cooling them back down. Thus, such actions both within the compute resources as well as the cooling facilities can be taken based on the state of the compute environment and workload to be consumed in the compute environment. Next, the method includes implementing the predicted at least one power consumption saving action in the compute environment (526). Other steps can include analyzing the compute environment and workload as the workload consumes resources in the compute environment and dynamically adjust the implemented and predicted at least one power consumption saving action based on the analysis. The system can increase or decrease the number of powered down nodes from an implemented amount or can increase or decrease an amount of powered down memory from an implemented amount. Furthermore, the system can also increase or decrease implemented steps dealing with the cooling facilities or can make modifications to job migration steps or a transfer of workload to a separate on demand center and so forth.

In another aspect, the system can receive a current power consumption state in the compute environment, and analyze queued jobs scheduled to consume resources in the compute environment and then predict power consumption when at least one of the queued jobs is consumed in the compute environment. Finally, the method involves consuming the at least one job in the compute environment with the at least one power consumption saving action. As noted above, the action may also be an action related to the temperature of the compute environment as well as other actions involving migrating or transferring workload to new areas of the environment or to other on-demand centers or other compute environments.

Figure 6:
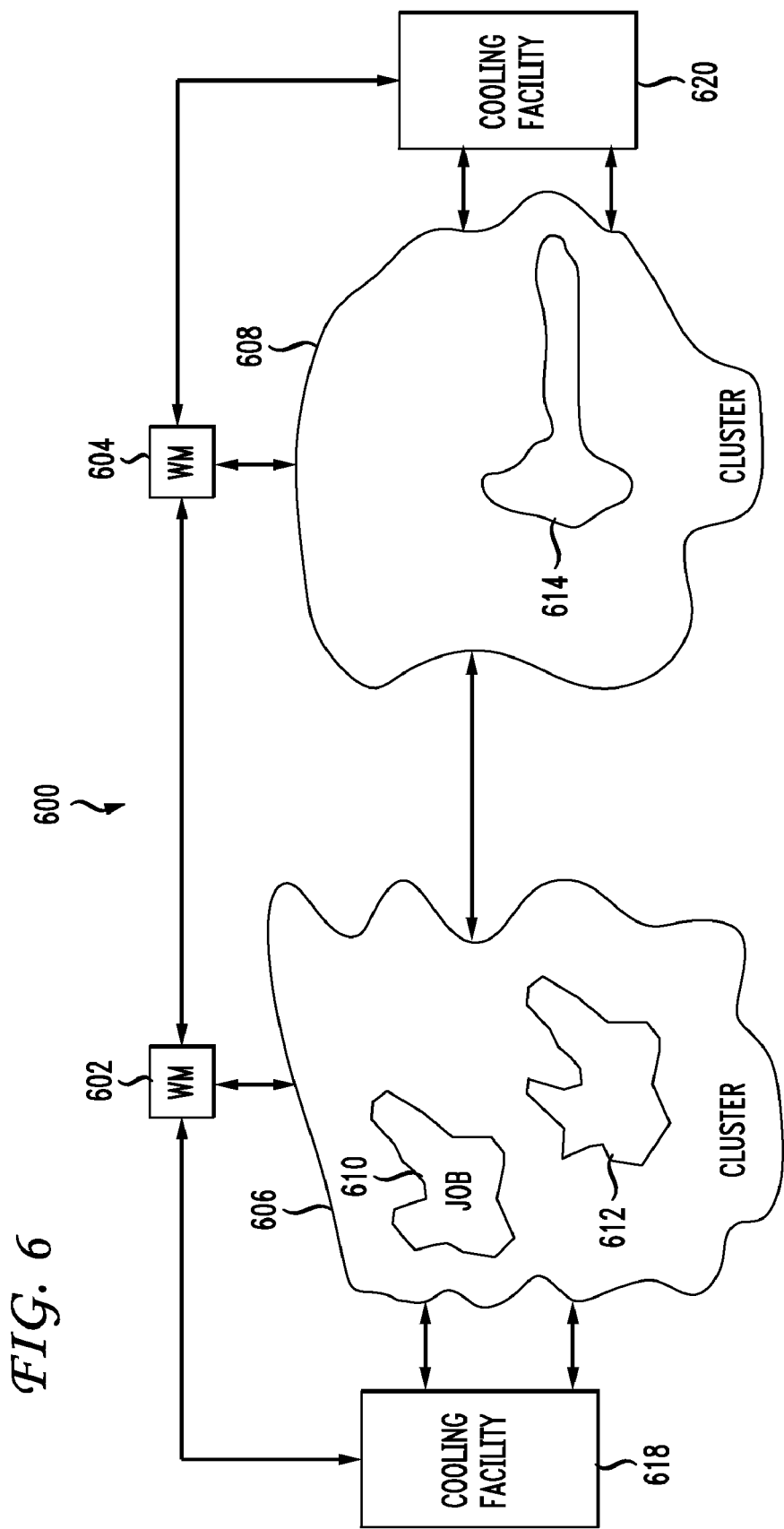
FIG. 6 illustrates several aspects of the disclosure.

FIG. 6 illustrates a network 600 showing several features of the disclosure and discussion set forth above. A first workload manager 602 manages distribution of workload in cluster 606. Within this cluster is a job 610 shown as consuming a particular set of resources within the cluster 606. One aspect described above relates to job migration from one portion of the cluster 606 to another portion 612 of the cluster. Thus, using the principled disclosed above, the workload manager 602 either alone or in connection with other software or control modules can receive at least one data point disclosed herein related to power consumption and provide instructions and control to manage the location, timing and so forth of the consumption of resources within the cluster 606. This portion of FIG. 6 simply illustrates how one job can be physically migrated to another portion of the same cluster. Also shown in FIG. 6 is a cooling facility 618 which generally represents air conditioning, ventilation or any other cooling or temperature management mechanisms which can be employed in association with the cluster 606. The workload manager 602 can also communicate with such a cooling facility 618 as well as via the link from the cluster to the other power consumption facilities discussed above to achieve the purposes and processes disclosed herein.

Also, as has been noted above, jobs can also be migrated from one cluster 606 to another cluster 608 and consumed therein 614. Thus, FIG. 6 also shows another workload manager 604 communicating both with workload manager 602 as well as a separate cluster 608. A cooling facility 620 is also shown in connection with cluster 608. FIG. 6 therefore illustrates an example where data points are received with regards to temperature costs and so forth as discussed above, and if a threshold is met, then the system can migrate job 610 from cluster 606 to cluster 608 and consume the resources 614 in cluster 608. Here, taking into consideration the costs of migrating data and workload across a network link between the two clusters, the system workload manager 602 can implement such a migration if, according to the affinities programmed into its algorithms, the power consumption savings justifies the migration. The particular configuration of FIG. 6 can of course be altered as would be known to those of skill in the art. For example, there can be a single instance of a workload manager that can manage both clusters, and so forth. Also not shown in the figure but would be known by those of skill in the art is workload managers typically work with resource managers such as TORQUE, from Cluster Resources, or any other known resource manager which manages the final communication and implementation of workload onto the nodes within a respective cluster. Of course, FIG. 6 can also apply to on-demand data centers, grids, or any commodity type multi-node compute environment.

Generally, method embodiments of the present disclosure involve utilizing at least one data point of the type discussed above, and based on one or more of those data points, making a determination according to programmed algorithms whether to take a particular action in order to improve the power consumption for a particular job, group, and so forth. Thus, from the disclosure above, there can be multiple methods which can be claimed using the variety of monitored or reported parameters as well as a variety of different types of actions which can be taken on the workload, the cluster, the cooling facilities, the energy management control capabilities, and so forth.

As set forth above, a number of related applications have been incorporated herein by reference. The energy conservation concepts disclosed herein can be applicable and blended with any of the concepts disclosed in the applications incorporated in this disclosure. One example of such a merging of energy conservation techniques in workload management and particular concepts incorporated herein relates to U.S. application Ser. No. 10/589,339. This application discloses intelligent pre-staging of data in a compute environment. The concepts discussed therein relate to intelligent data "just in time" data pre-staging that optimizes the use of diverse compute resources. One example of a mechanism to achieve data pre-staging is to generate a data staging reservation earlier in time to a compute reservation. A compute reservation can be one in which a processor or a group of processors are reserved for performing the computation portion of a reservation. A data staging reservation is disclosed to overlap the compute reservation in an appropriate amount of time in order to provide the necessary data ("just in time") to the compute resources for processing the job. In this case, the data resources can be reserved for another entity since these resources are not needed until the data stage-out reservation which can involve, for example, receiving the process data from an analysis of a nuclear stockpile.

In addition to the stage-in reservation, the compute reservation and a stage-out reservation, an aspect of the present disclosure can involve receiving information related to power consumption and energy use for these various reservations. For example, a data stage-in reservation can be established prior to a compute reservation which is timed to provide the data in a just in time mode for use in computation. However, there can be modifications which can be made to that data stage-in reservation in which power consumption can be minimized while also maintaining adequate SLA performance on the particular job. For example, if the data pre-staging were to occur without energy consumption in mind, the data pre-staging can utilize a relatively large amount of power and generate excess heat. In one example, the data pre-staging may not be established to be just in time but the data can be pre-staged ten minutes in advance of the compute reservation and the workload management algorithms may be able to maintain conformity with the SLA agreements but save power and reduce the temperature in the compute environment based on a modification such as this.

Therefore, this example provides an illustration, many variations of which are conceivable, in which the optimization algorithms can include the energy conservation affinities and make appropriate changes within the environment in order to take these additional parameters related to the environment into account. Therefore, any data associated with any of the incorporated applications can be modified in a similar manner to take into account all of the available energy consumption information. Additionally, the other controllable components with regards to power consumption and temperature can also be adjusted, such as chillers and so forth, in the context of any of the decisions that are made with regards to workload management in any of the applications incorporated herein by reference.

Embodiments within the scope of the present disclosure can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, mini-computers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description may contain specific details, they should not be construed as limiting the claims in any way. Accordingly, the appended claims and their legal equivalents should only define the invention, rather than any specific examples given.

I claim:

1. A method comprising:
 receiving information associated with energy consumption in a data center and information associated with a climate condition to yield received information;
 analyzing, at a first time, workload that is scheduled to consume resources at a second time which is later than the first time, in the data center to yield an analysis of the workload; and
 modifying use of resources of the data center based on the received information and the analysis of the workload.

2. The method of claim 1, wherein, when the received information comprises energy consumption, then the energy consumption is based a component within a node.

3. The method of claim 2, wherein the component comprises a processor, a processor core, a random access memory, a storage device, and a cooling device.

4. The method of claim 1, wherein the received information is based on information further associated with node utilization in the data center.

5. The method of claim 1, wherein the received information is based on information further associated with a climate condition at a location of the data center.

6. The method of claim 1, wherein modifying use of the resources further comprises at least one of powering up a node, powering down a node, placing a node into a sleep state, and performing a power consumption saving action.

7. The method of claim 6, wherein modifying use of the resources is at least one of: powering down memory, spinning down a disk, lowering a clock speed of a processor, powering down a hard drive, and placing a resource in a low power consumption mode.

8. The method of claim 1, wherein modifying use of the resources further comprises communicating with a cooling facility to control at least one of air conditioning, ventilation, a chilling unit, and a temperature management mechanism.

9. The method of claim 1, wherein modifying use of the resources comprises transferring workload from one node to another node within one of the data center.

10. The method of claim 1, wherein modifying use of the resources further comprises migrating workload from the data center to a second data center distributed from the data center.

11. The method of claim 10, wherein migrating workload is based on information relating to differing energy costs depending on at least one of a region, a time of day, a time of year, and a cumulative amount of energy used during a certain period of time.

12. The method of claim 1, wherein modifying use of the resources is further based on an input from a user regarding a balance between saving energy and reduction in performance.

13. A system for managing workload in data centers, the system comprising:
a processor; and
a computer-readable storage medium storing instructions, which, when executed by the processor, perform the a method comprising:
receiving information associated with energy consumption in a data center and information associated with a climate condition to yield received information;
analyzing, at a first time, workload to consume, at a second time which is later than the first time, compute resources in the data center to yield an analysis of the workload; and
modifying use of resources of the data center based on the received information and the analysis of the workload.

14. The system of claim 13, wherein, when the received information comprises energy consumption, then the energy consumption is based a component within a node.

15. The system of claim 13, wherein the component comprises a processor, a processor core, a random access memory, a storage device, and a cooling device.

16. A non-transitory computer-readable storage medium storing instructions for controlling a computing device to manage workload in a data center, the instructions comprising:
receiving information associated with energy consumption in a data center and a climate condition to yield received information;
analyzing, at a first time, workload to consume , at a second time which is later than the first time, compute resources in the data center to yield an analysis of the workload; and
modifying use of resources of the data center based on the received information and the analysis of the workload.

* * * * *